Figure 1:
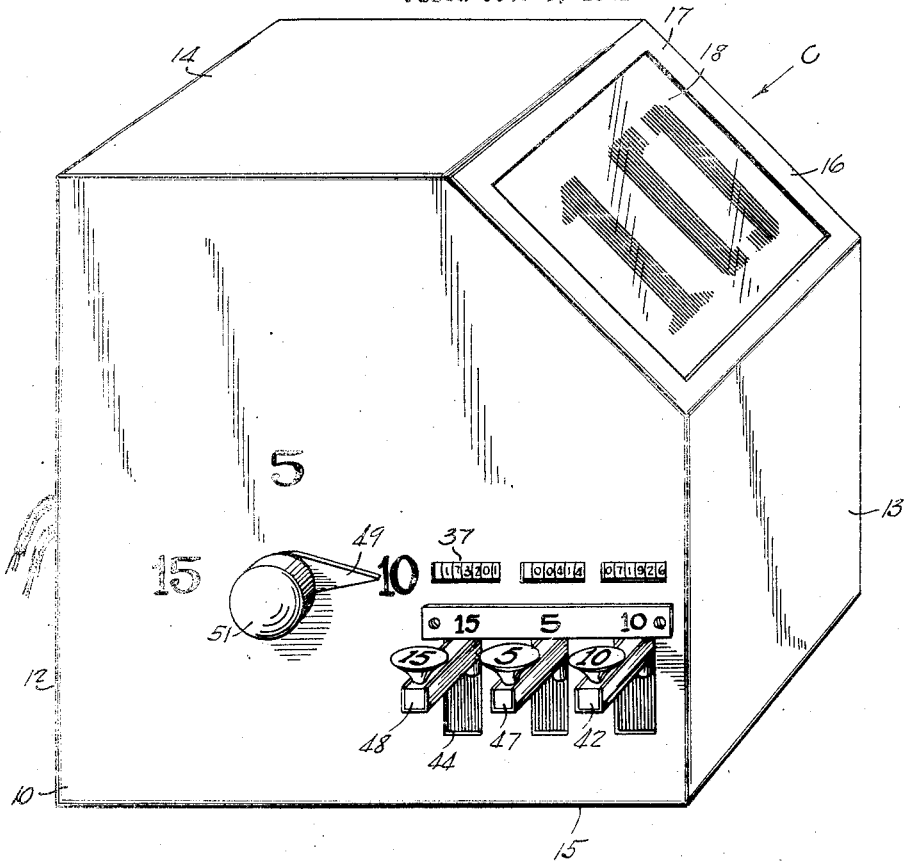

June 8, 1943.   S. E. STEWART   2,321,164
FARE REGISTERING AND INDICATING DEVICE
Filed Oct. 3, 1941   3 Sheets-Sheet 1

INVENTOR.
SAMUEL E. STEWART
BY Joshua R. H. Potts
ATTORNEY

June 8, 1943. S. E. STEWART 2,321,164
FARE REGISTERING AND INDICATING DEVICE
Filed Oct. 3, 1941 3 Sheets-Sheet 2

INVENTOR.
SAMUEL E. STEWART
BY Joshua R. H. Potts
ATTORNEY.

June 8, 1943. S. E. STEWART 2,321,164
FARE REGISTERING AND INDICATING DEVICE
Filed Oct. 3, 1941 3 Sheets-Sheet 3

INVENTOR.
SAMUEL E. STEWART
BY Joshua R. H. Potts
ATTORNEY.

Patented June 8, 1943

2,321,164

UNITED STATES PATENT OFFICE 2,321,164

FARE REGISTERING AND INDICATING DEVICE

Samuel E. Stewart, Upper Darby, Pa.

Application October 3, 1941, Serial No. 413,400

3 Claims. (Cl. 235—33)

This invention has to do with devices employed for registering fares as they are collected by operators of buses, street cars and similar public conveyances; the invention being concerned primarily with registering devices that include means for visibly indicating the amount of a fare registered thereon.

At the present time operators of public conveyances of the character above noted are encouraged to dishonest habits because of the fact that there is not now available to the operating companies a practical registering and indicating device which will not only register the amount of the fare collected but also indicate the amount in such a manner that the indication is visible to persons in all parts of the vehicle. The present invention is predicated on the belief that dishonesty on the part of the vehicle operator will be greatly discouraged, if not, in fact, definitely precluded, by so noticeably indicating the amount of the fare collected that anyone in any part of the vehicle may see it. While attempt has been made to provide devices intended to accomplish the same general objects as above set forth they have not been accepted, generally, by the operating companies, probably because of the impractical and complex nature of the now available devices.

Accordingly, this invention has in view as its foremost objective the provision of a practical and simplified device for registering fares collected and at the same time visibly indicating the amount of the fare. A somewhat more detailed object is the provision of such a device including an audible signal for indicating the fact that a fare has been registered.

In carrying out this objective in a practical embodiment the invention has in mind the provision of a device including a plurality of counter mechanisms, there being a counter for each denomination of fare which might be collected. Associated with each counter mechanism is an operating member. Cooperating dial elements, one of which is movable, indicate to the driver the amount of fare which will be registered, counted, and signalled to other observers when the proper operating member is pressed, and cooperating means prevent the registry, counting, and signalling of fares which do not correspond to the fare for which the dial members are set with respect to each other.

More in detail an object of this invention is the provision of a device of the character above noted in which a movable shield assembly, carrying a plurality of indicia defining cut outs, interposes one of said indicia between a spaced light source and screen to project onto said screen a fare corresponding to the one for which the dial elements are set with respect to each other when an operating member is depressed.

A further object is the provision of such an arrangement as set forth in the preceding paragraph in which an optical instrumentality is included for focusing light that passes from the light source through the cut out indicia onto the screen.

Still another object of the invention is the provision of a fare registering and indicating device of the type above outlined in which an electrical circuit for the light source is provided and which circuit includes switches that are associated with the several operating members for the counter mechanisms. Thus, as any operating member is operated a switch is affected to close the circuit for the light source.

Along the same line a further detailed object is the provision of an audible signal which is preferably electrically operated with the electrical means included in the circuit of the light source.

Various other more detailed objects and advantages of the invention will in part become apparent, and in part be hereinafter stated, as the description of the invention proceeds.

The invention, therefore, comprises a fare registering and indicating device consisting of a plurality of counter mechanisms with each of which is associated an operating member, a movable element of cooperating dial elements is operatively connected to controlling means for said operating members of the counter mechanism so that only the operating member corresponding to the fare indicated on the dial elements may be operated. A shield assembly is also operatively connected to the movable dial element. This shield assembly includes a plurality of shields each having a cut out indicia for indicating the amount of a fare. A light source and a screen are disposed on opposite sides of the shield assembly and any one of the shield elements of the assembly is adapted to be interposed between said light source and screen by operation of the movable dial. An optical instrumentality is also included for condensing and focusing light from the light source and causing it to be cast through the cut out of the shield onto the screen. The light source and an audible signal are included in an electrical circuit controlled by switches that are operated by said operating members.

Figure 3:
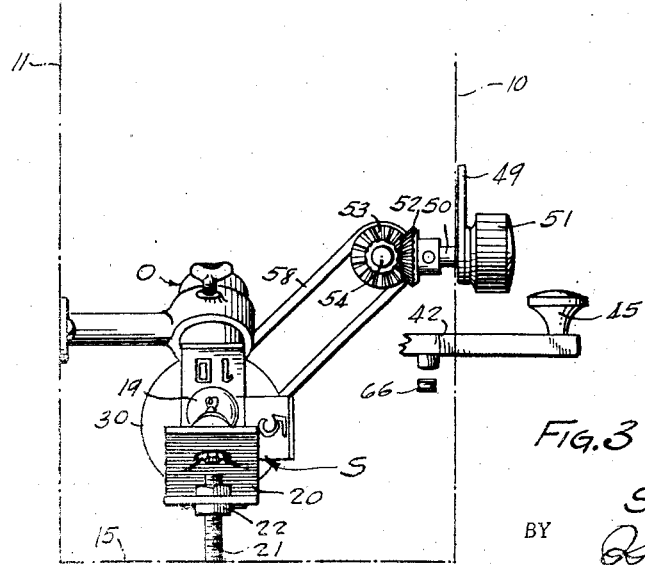
Figure 2:
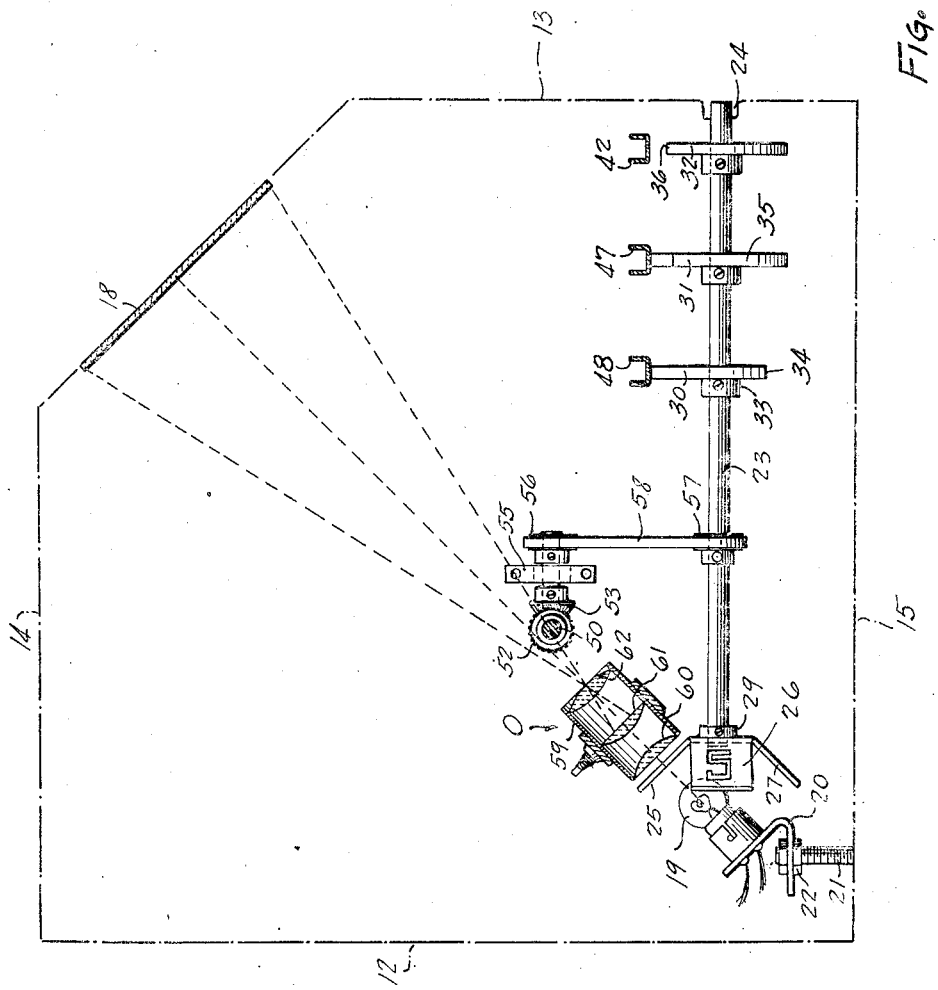
Figure 5:
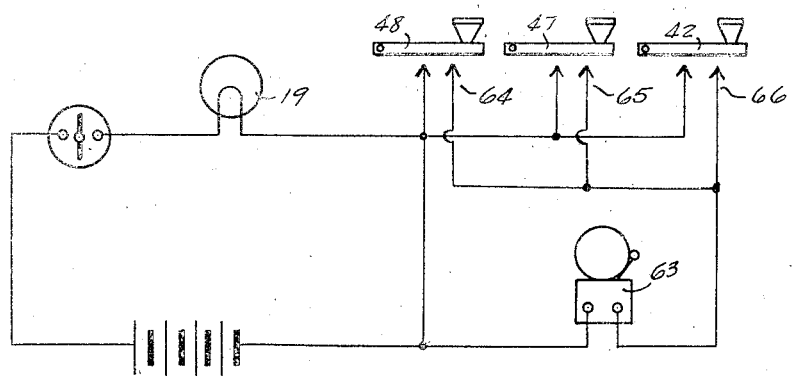
Figure 4:
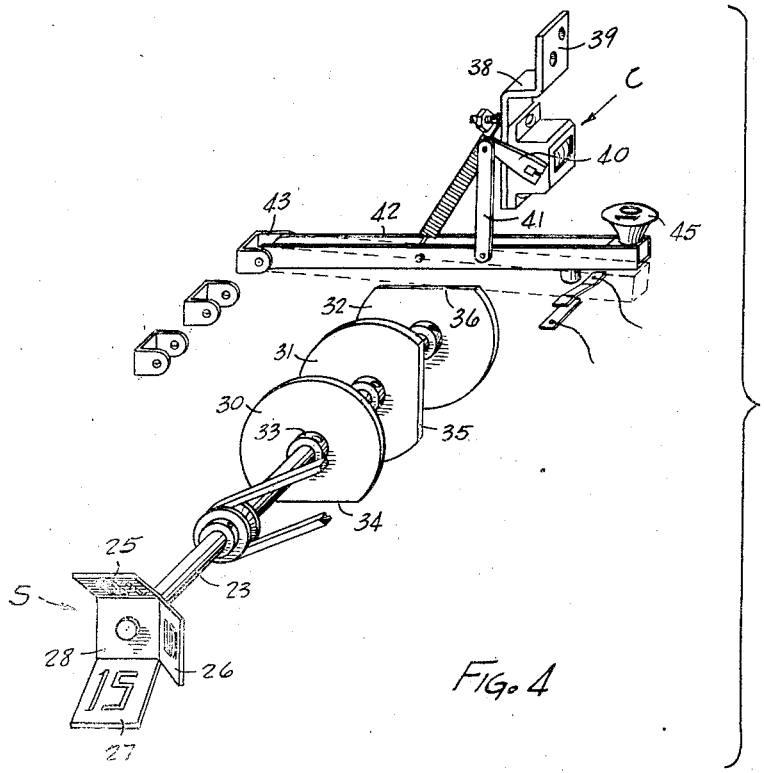

For a full and more complete understanding of the invention reference may be had to the following description and accompanying drawings wherein Figure 1 is a perspective view of a fare registering and indicating device which is made in accordance with the precepts of this invention, Figure 2 is a side view developing the casing structure of the device diagrammatically and showing certain of the operating parts in side elevation and others in section, Figure 3 is a view similar to Figure 2 but taken on a plane normal thereto, Figure 4 is a detailed perspective showing certain of the connections between the movable operating dial element and the shield assembly and operating members for the counter mechanisms and Figure 5 is a diagrammatic representation of the electrical circuit for the light source and audible signal.

Referring now to the drawings wherein like reference characters denote corresponding parts, and first more particularly to Figure 1, the fare registering and indicating device of this invention is shown as comprising a casing referred to in its entirety by the reference character C and which casing houses the various mechanisms, means, devices and instrumentalities making up the complete machine. The casing C comprises side walls 10 and 11 (see Figure 3), a rear wall 12, a front wall 13, top 14, bottom 15 and an inclined front wall 16. It will be noted that the corner which, ordinarily, would be defined by the top and front walls 14 and 13 is cut away to shorten these walls and provide the inclined wall 16. This inclined wall 16 consists of a marginal frame 17 which houses a screen which preferably takes the form of a piece of frosted glass such as represented at 18.

In the corner diagonally opposite to the inclined wall 16, that is, the corner defined by rear wall 12 and bottom 15, is located a light source which may take the form of an electric lamp such as illustrated at 19. This lamp 19 may be mounted in any preferred manner such as by the bracket 20 which is anchored to the bottom 15 by bolt 21 and nuts 22.

A shaft 23 has one end journaled in the front wall 13, as represented at 24, and another bearing for the shaft may be provided at any appropriate point spaced from this front bearing. The shaft 23 extends from the front wall 13 to a point spaced from the lamp 19. Carried on this free end of the shaft 23 is a shield assembly referred to in its entirety by the reference character S. In the illustrated embodiment the shield assembly S consists of three shield elements 25, 26 and 27 which extend outwardly in the inclined manner illustrated from a base 28. This base 28 is anchored to shaft 23 as shown by the collar 29 and it is apparent that any one of the shield elements 25, 26 and 27 is adapted to be brought into position immediately in front of the lamp 19 and between this lamp and the screen 18. Each of the shield elements 25, 26 and 27 is provided with cut out indicia, that is, the shield itself is cut away to define indicia which will indicate the amount of a fare being registered. One shield element is designed for a fare of one denomination while a cut out of another shield element is for a fare of a different denomination.

It is to be noted that the device herein illustrated and described is particularly designed for the registering and indicating of fares of three different denominations, namely, five, ten and fifteen cents. It is to be clearly understood that this is to be no limitation on the invention as to the particular denomination or number of denominations since they may be varied without departing from the invention.

The shaft 23 carries a plurality of cam disks which are disposed thereon in spaced relation. These disks correspond in number to the number of denominations of fares. In the present instance there are three cam disks which are designated 30, 31 and 32. Each of the disks 30, 31 and 32 is anchored to the shaft 23 in driving relation by a collar such as shown at 33. It will be noted that each of the cam disks 30, 31 and 32 has its circular edge cut away to provide flats 34, 35 and 36. It is important to note that these flats are in an offset relation to each other, thus, the flat 35 has a relation of 90° to the flat 34 while the flat 36 is disposed in a 180° relation to the flat 34. These cam disks are provided for the purpose of controlling the operation of certain operating members in a manner to be hereinafter pointed out.

A plurality of counter mechanisms are anchored to the inner face of the side wall 10. The side wall 10 may be cut away at appropriate points to provide windows 37 through which the indicia of the counter mechanisms may be viewed. The windows 37 correspond in number to the number of counter mechanisms. One of these counter mechanisms is shown in perspective in Figure 4 and is referred to in its entirety by the reference character C. Counter mechanisms of this type are well-known and available to the purchasing public. Counter mechanism C is shown as being carried by bracket 38 having a foot 39 which is anchored to the inner face of the wall 10 so as to bring the counter C in line with the proper window 37. Counter mechanism C includes an arm 40 having a free end to which is connected a link 41. The lower end of this link 41 is connected to an operating member which takes the form of a lever 42. The lever 42 is pivoted at one end to a bracket 43 which may be carried by the side wall 11. The side wall 10 is formed with a series of slots 44 that correspond in number and position to the windows 37, each of the slots 44 being disposed below one of the windows 37. The operating lever 42 projects through one of the windows 44 to render its free end accessible. This free end may carry a push tab such as shown at 45 and which tab may carry indicia for indicating the amount of the fare which is to be rung up by that particular counter. A tension coil spring shown at 46 has one end secured to the lever 42 and its other end to the bracket 38. This spring 46 normally serves to maintain the lever in an upraised position The lever 42 which is shown in Figure 4 and which has been above described is designed for registering a ten cent fare as illustrated. This lever and the counter mechanism C, associated therewith, is duplicated for each of the other fare denominations. The same mechanisms and means are associated with the lever represented at 47 in Figure 1 for the five cent fare and again with the lever 48 which is shown for the fifteen cent fare. It is to be noted that the arrangement of the flats 34, 35 and 36 of the cam disks on the shaft 23 permits of the depression of only one of the levers 42, 47 or 48 at any one time. Thus, in the position depicted in Figure 4 the flat 36 is at the top and only the lever 42 may be depressed. This same condition is carried over into Figure 2 in which it will be noted that the circular edge surfaces of the cam disks 30 and 31 engage the levers 48 and 47 to prevent their depression. Obviously, rotation of the shaft 23 may bring either of the other flats 34 or 35 to the top to permit the operation of respective operating lever 48 or 47.

Cooperating dial elements are provided by a pointer 49 and indicia inscribed on the outer face of the side wall 10. The pointer 49 is non-rotatably mounted on a stub shaft 50 which has bearing in the side wall 10. Exterior of the side wall 10 the stub shaft 50 carries an operating knob 51. This stub shaft 50 extends into the interior of the casing C and its free end carries a beveled gear 52. Another beveled gear 53 is complemental to and meshes with the gear 52. This gear 53 is driveably carried by shaft 54 that is journaled in a bracket 55 that is anchored to the front wall 10. At its other end the shaft 54 driveably carries a pulley 56. A second pulley 57 is driveably mounted on the shaft 23 and an endless drive belt 58 passes over the pulleys 56 and 57. It is evident that as the knob 51 is rotated to move the pointer 49 to a proper location in relation to the indicia on the outer face of the wall 10, that the shaft 23 will be rotated through the connections above described. This rotation of the shaft 23 causes rotation of the cam disks and the shield assembly.

An optical instrumentality for focusing a light from the lamp 19 is represented, generally, by the reference character O. This optical means comprises a barrel 59 which carries necessary lenses shown at 60, 61 and 62. It is evident that light coming from the lamp 19 and through the cut out indicia of one of the shield elements will be focused and cast onto the screen 18 to define an image corresponding to the cut out of the shield.

An audible signal may be located at any point desirable with the casing C. Such an audible signal is represented diagrammatically in Figure 5 and is designated 63. The audible signal may take the form of a well-known type of gong which is electrically operated. This gong will be placed in an electrical circuit which includes the lamp 19 and three controlling switches shown at 64, 65 and 66. These switches 64, 65 and 66 are located beneath the levers 48, 47 and 42 so that upon depression of any one of the levers the switch will be closed to complete the circuit of the lamp 19 and gong 63.

While the operation of the above described device is believed to be obvious from the foregoing description it may be briefly summarized by noting that when the operator of a public conveyance collects a fare he will first rotate the knob 51 so that the pointer 49 will come into registry with the particular number corresponding to the fare collected. Thus, under the conditions depicted in the drawing, when a ten cent fare is collected the pointer 49 is brought opposite the number 10. Through the driving connections between the shaft 50 on which the knob 51 is mounted the shaft 23 is also rotated so that the flat 36 on cam disk 32 is brought to the topmost position beneath the lever 42 leaving this lever free to be depressed. At the same time the circular edge surfaces of cam disks 30 and 31 are brought into engagement with levers 48 and 47 so that the depression of these levers is definitely precluded. At the same time the shield element 25 is brought into position immediately in front of the lamp 19 and between this lamp and the optical instrumentality O. The operator then presses against the tab 45 on the lever 42 to depress this lever. As the lever is depressed two things happen, the counter mechanism C is operated in the well-known manner and the switch 66 is closed to complete the electrical circuit of the lamp 19 and gong 63. Thus, the gong sounds to noticeably call attention to the fact that a fare is being rung up and at the same time the amount of the fare is flashed on the screen 18.

Under certain conditions, such as when the operator of the public conveyance carrying the fare registering and indicating device is hurried he may not bring the dial 49 into accurate alignment with the indicia on the outer face of the wall 10, that is, the point of the dial may not be exactly on the five, ten or fifteen cent mark. However, the particular type of cam disk employed is intended to remedy any such inaccuracy. Should the inaccuracy be present the flat 34, 35 or 36 which is in the uppermost position, will be slightly tilted. However, after the operating member 42, 47 or 48 is depressed its engagement with the respective flat will cause the slight turning of the shaft 23 necessary to accurate position.

While a preferred specific embodiment of the invention is hereinbefore set forth it is to be clearly understood that the invention is not to be limited to the exact construction illustrated and described, because various modifications of these details may be provided in putting the invention into practice within the purview of the appended claims.

I claim:

1. A fare registering and indicating device comprising a housing, a fare indicia image projection screen carried by a wall of said housing for inspection from the exterior of said housing, an optical system including a light source within said housing and spaced from said projection screen, a fare indicia member interposable between said light source and said screen within said housing, counter mechanism and fare indicia member operating mechanism arranged within said housing laterally of the optical path between said light source and said screen, and control means for said light source, fare indicia member, and said counter mechanism extending from the interior of said housing to the exterior for manipulation by an operator.

2. Apparatus of the character described comprising a casing, an image screen carried by said casing in position for inspection from the exterior of said casing, an electric lamp in said casing remote from said screen and in position to light said screen, said casing having a wall formed with a plurality of slots, counter mechanism within said casing, an operating member extending from each counter mechanism through one of said slots to the exterior of said casing, a shaft within said casing running transversely of said counter mechanism operating members, a shield assembly carried by said shaft and including shield elements selectively movable into the optical path between said electrical lamp and said screen to project indicia images on said screen, cam elements carried by said shaft and disposed beneath said operating members for selectively restraining the operation thereof in accord with the position of said shield elements, cooperating dial elements including a movable dial element, operating connections between said movable dial elements and said shaft for causing rotation of said shaft to bring the desired fare indicia shield across said optical path and release the proper counter mechanism operating member.

3. A fare registering and indicating device comprising a closed housing, a fare indicia image projection screen carried by an end wall of said housing for inspection from the exterior of said housing, an optical system within said housing and spaced from said projection screen to project enlarged images thereon, counter mechanisms arranged within said housing laterally of the path between said optical system and said screen, rotatable restraining means for selectively locking said counter mechanisms, a fare indicia member carried by said rotative resrtaining means in position to interpose a proper fare indicia character into the optical path between said optical system and projection screen, and control means exterior of said casing and communicating with the interior thereof for operating said rotatable restraining means.

SAMUEL E. STEWART.